United States Patent
Sheriff

(10) Patent No.: US 10,916,954 B1
(45) Date of Patent: Feb. 9, 2021

(54) MOBILE DEVICE CASE

(71) Applicant: Alhusain Sheriff, Malden, MA (US)

(72) Inventor: Alhusain Sheriff, Malden, MA (US)

( * ) Notice: Subject to any disclaimer, the term of this patent is extended or adjusted under 35 U.S.C. 154(b) by 0 days.

(21) Appl. No.: 16/701,271

(22) Filed: Dec. 3, 2019

(51) Int. Cl.
*H02J 7/00* (2006.01)
*G06F 1/16* (2006.01)
*H04B 1/3888* (2015.01)

(52) U.S. Cl.
CPC .......... *H02J 7/0044* (2013.01); *G06F 1/1628* (2013.01); *H04B 1/3888* (2013.01); *G06F 1/1626* (2013.01)

(58) Field of Classification Search
CPC ......... H02J 7/0044; H02J 7/00; G06F 1/1628; G06F 1/1626; G06F 1/16; H04B 1/3888
See application file for complete search history.

(56) References Cited

U.S. PATENT DOCUMENTS

| | | | |
|---|---|---|---|
| 9,654,164 B2 | 5/2017 | Irci | |
| 9,698,623 B2 | 7/2017 | Adams | |
| 9,929,577 B2 | 3/2018 | Fathollahi | |
| 10,027,151 B2 | 7/2018 | Ezzi | |
| D832,245 S | 10/2018 | Jeon | |
| 10,170,738 B2 | 1/2019 | Huang | |
| 2019/0067965 A1 | 2/2019 | Liang | |

FOREIGN PATENT DOCUMENTS

WO 2015084775 6/2015

*Primary Examiner* — Robert L Deberadinis
(74) *Attorney, Agent, or Firm* — Kyle A. Fletcher, Esq.

(57) ABSTRACT

The mobile device case is configured for use with one or more personal data devices. The mobile device case comprises a protective shell, a distribution circuit, and a distribution cable. The distribution cable electrically connects to the distribution circuit. The distribution circuit mounts in the protective shell. A personal data device selected from the one or more personal data devices installs in the protective shell. The remaining one or more personal data devices electrically connect to the distribution cable such that each of the remaining one or more personal data devices draws electrical energy from the distribution circuit. The distribution circuit is an electrochemical structure that: a) stores chemical potential energy; b) converts the chemical potential energy into electrical energy; and, c) distributes the converted electrical energy to the remaining one or more personal data devices.

20 Claims, 5 Drawing Sheets

MOBILE DEVICE CASE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity and the distribution of electric power, more specifically, a circuit arrangement for charging and depolarizing a battery. (H02J7/0044)

SUMMARY OF INVENTION

The mobile device case is configured for use with one or more personal data devices. The mobile device case comprises a protective shell, a distribution circuit, and a distribution cable. The distribution cable electrically connects to the distribution circuit. The distribution circuit mounts in the protective shell. A personal data device selected from the one or more personal data devices installs in the protective shell. The remaining one or more personal data devices electrically connect to the distribution cable such that each of the remaining one or more personal data devices draws electrical energy from the distribution circuit. The distribution circuit is an electrochemical structure that: a) stores chemical potential energy; b) converts the chemical potential energy into electrical energy; and, c) distributes the converted electrical energy to the remaining one or more personal data devices.

These together with additional objects, features and advantages of the mobile device case will be readily apparent to those of ordinary skill in the art upon reading the following detailed description of the presently preferred, but nonetheless illustrative, embodiments when taken in conjunction with the accompanying drawings.

In this respect, before explaining the current embodiments of the mobile device case in detail, it is to be understood that the mobile device case is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mobile device case.

It is therefore important that the claims be regarded as including such equivalent construction insofar as they do not depart from the spirit and scope of the mobile device case. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
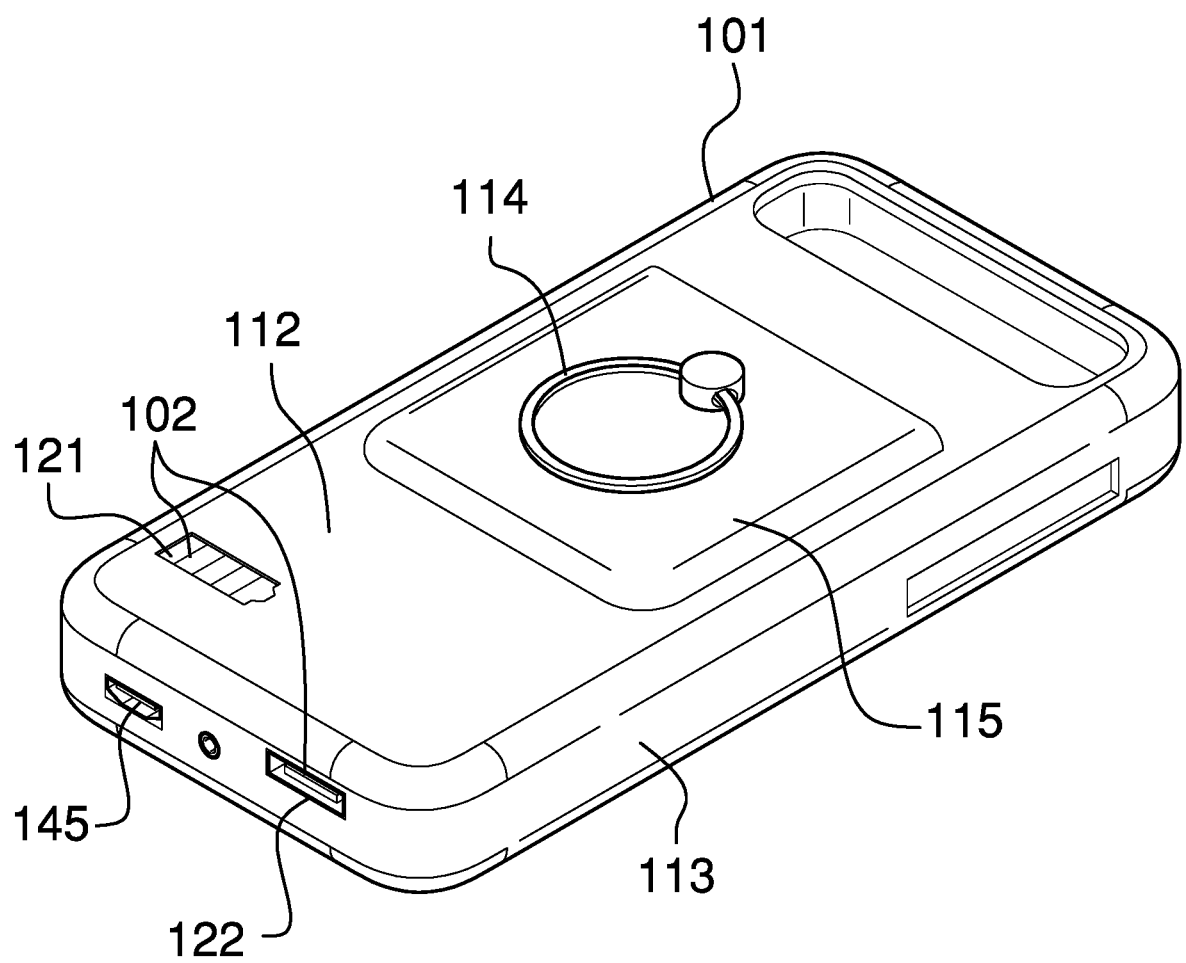
FIG. 1 is a perspective view of an embodiment of the disclosure.
Figure 2:
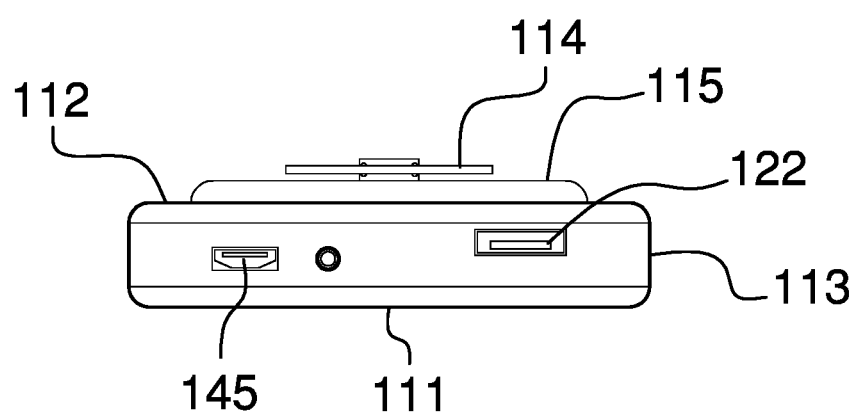
FIG. 2 is a bottom view of an embodiment of the disclosure.
Figure 3:
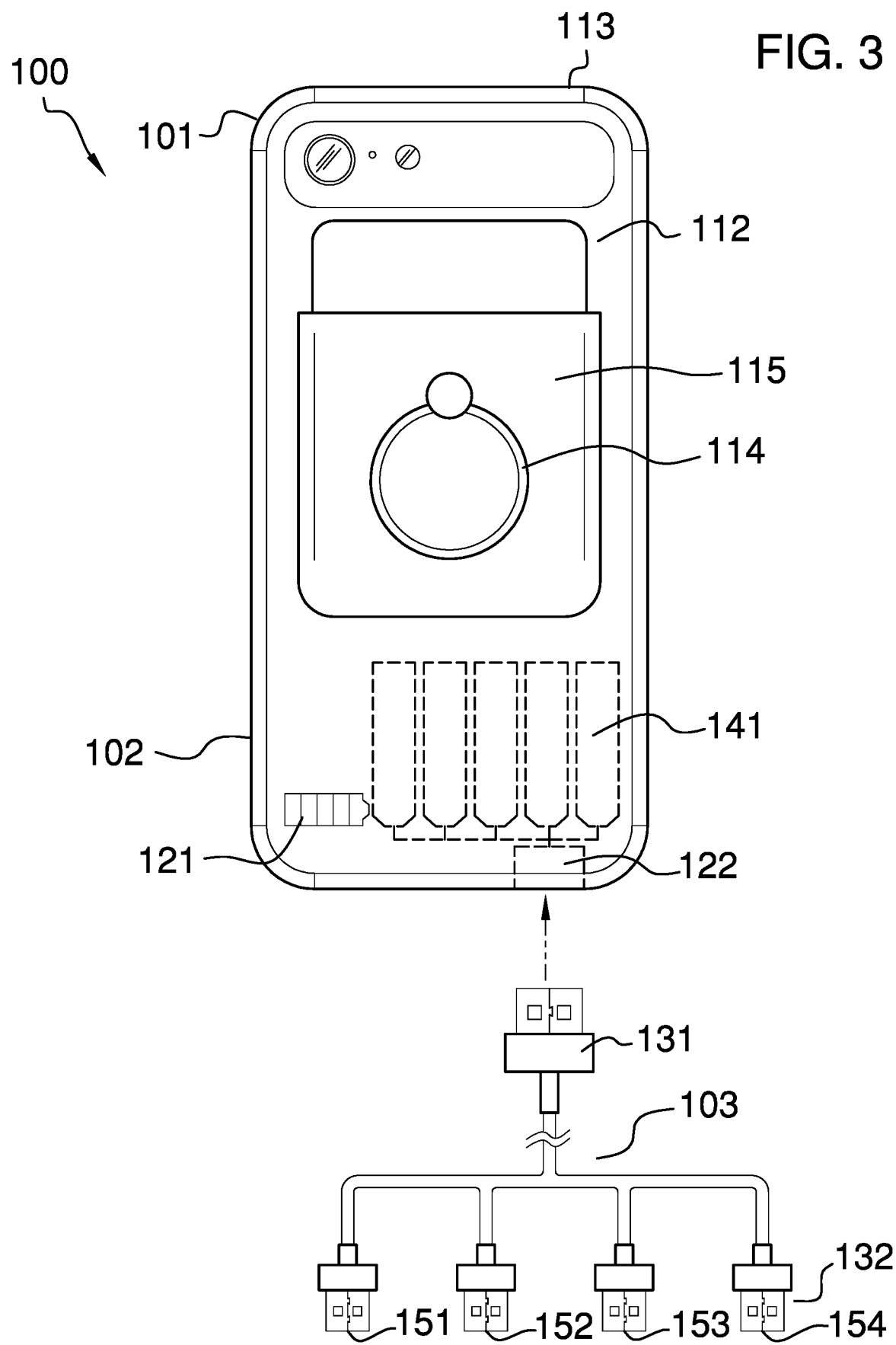
FIG. 3 is a rear view of an embodiment of the disclosure.
Figure 4:
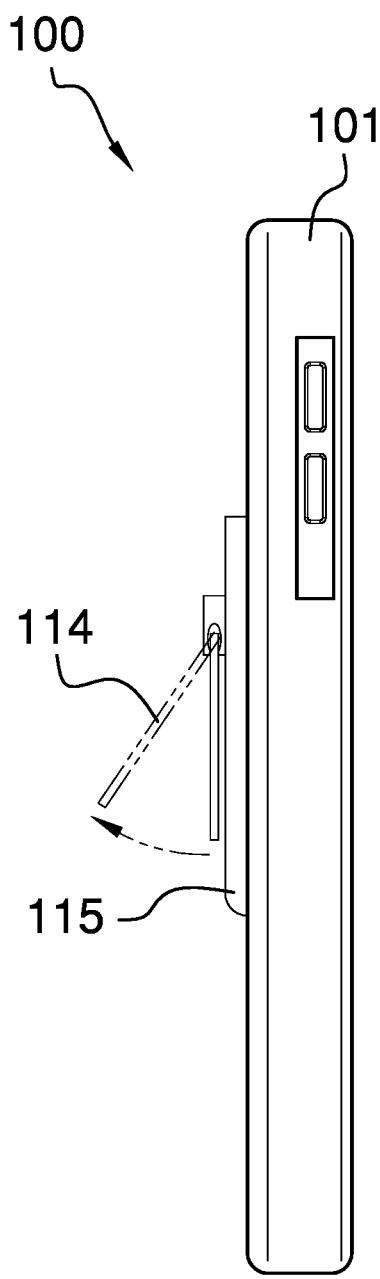
FIG. 4 is a side view of an embodiment of the disclosure.
Figure 5:
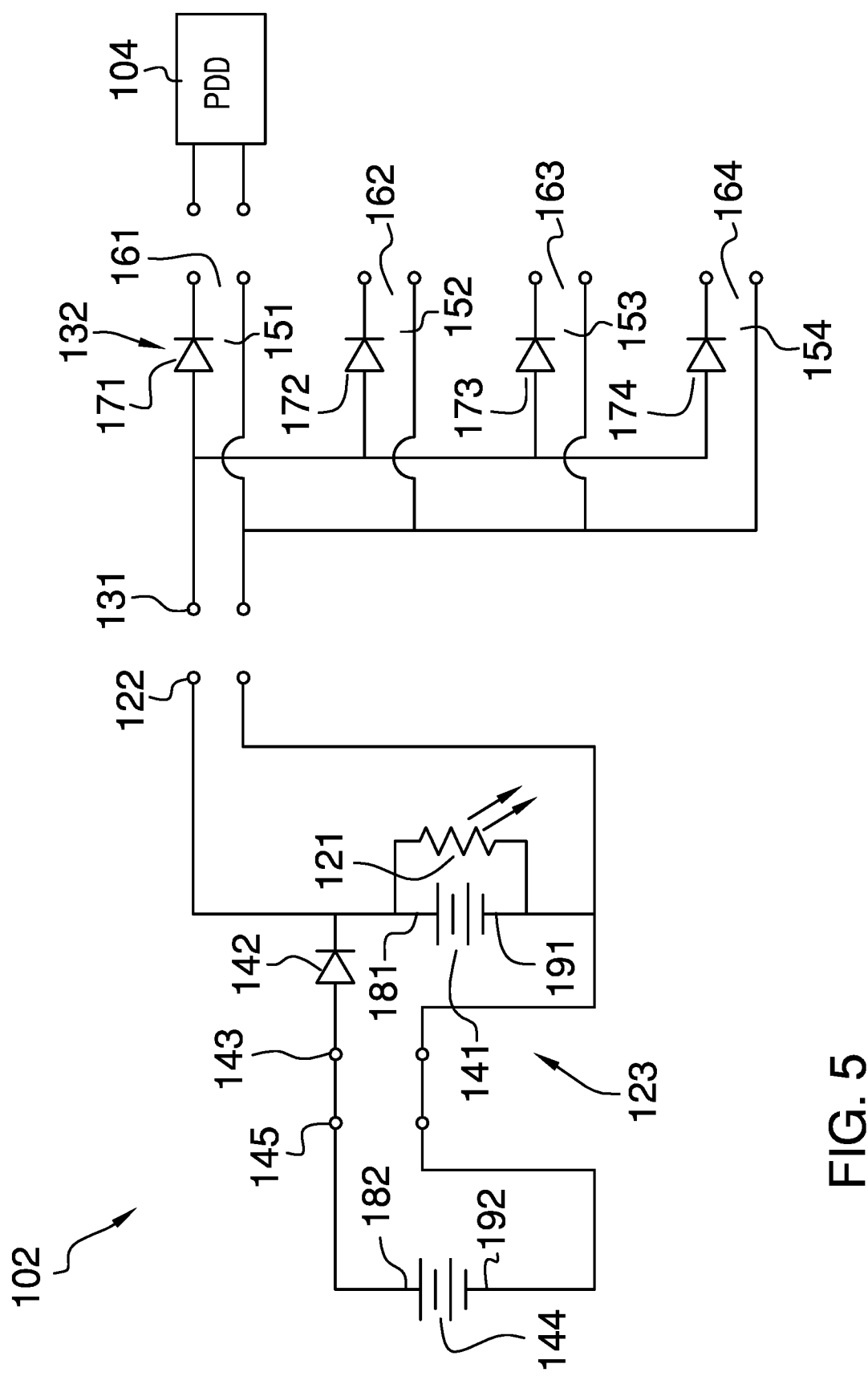
FIG. 5 is a schematic view of an embodiment of the disclosure.

Detailed reference will now be made to one or more potential embodiments of the disclosure, which are illustrated in FIGS. 1 through 5.

The mobile device case 100 (hereinafter invention) is configured for use with one or more personal data devices 104. The invention 100 comprises a protective shell 101, a distribution circuit 102, and a distribution cable 103. The distribution cable 103 electrically connects to the distribution circuit 102. The distribution circuit 102 mounts in the protective shell 101. A personal data device selected from one or more personal data devices 104 installs in the protective shell 101. The remaining one or more personal data devices 104 electrically connect to the distribution cable 103 such that each of the remaining one or more personal data devices 104 draws electrical energy from the distribution circuit 102. The distribution circuit 102 is an electrochemical structure that: a) stores chemical potential energy; b) converts the chemical potential energy into electrical energy; and, c) distributes the converted electrical energy to the remaining one or more personal data devices 104.

Each of the one or more personal data devices 104 is a programmable electrical device that provides data management and communication services through one or more functions referred to as an application. The application is a set of logical operating instructions that are performed by each of the one or more personal data devices 104. The addition of an application will provide increased functionality for each of the one or more personal data devices 104. This disclosure assumes that any necessary application exists for the purpose of interacting with the invention 100. The personal data device is defined elsewhere in this disclosure. Methods to design and implement an application on a personal data device are well known and documented in the electrical arts.

The protective shell 101 is a protective structure. The protective shell 101 is a rigid structure. The protective shell 101 contains a personal data device selected from the one or more personal data devices 104 and the distribution circuit 102. The protective shell 101 is formed with all apertures and form factors necessary to allow the protective shell 101 to accommodate the distribution cable 103 plugging into the distribution circuit 102. The protective shell 101 is formed with all apertures and form factors necessary to allow the protective shell 101 to accommodate the use and operation of the one or more personal data devices 104. Methods to form a protective shell 101 suitable for the purposes described in this disclosure are well-known and documented in the mechanical arts.

The protective shell 101 has a roughly prism shape. The protective shell 101 has a roughly pan shape. The protective shell 101 contains a personal data device selected from the one or more personal data devices 104 such that the selected personal data device is useable while in the protective shell 101. The protective shell 101 contains the selected personal data device such that the selected personal data device is protected from impact damage while in the protective shell 101. The protective shell 101 is a well-known and documented device in the communication arts. The protective shell 101 comprises an open face 111, a closed face 112, and a plurality of lateral faces 113. The protective shell 101 further comprises a ring 114 and a credit card pocket 115.

The ring 114 is a loop structure used to attach an item to the protective shell 101. The ring 114 attaches to the exterior surface of the credit card pocket 115. The ring 114 is a key ring 114 used to anchor domestic articles to the protective shell 101. The credit card pocket 115 is a storage space that mounts on the exterior surface of the closed face 112 of the protective shell 101. The credit card pocket 115 is sized such that a credit card can be stored within the credit card pocket 115. The credit card pocket 115 stores the credit card in a manner such that the credit card is accessible from the exterior of the protective shell 101. The credit card is defined elsewhere in this disclosure.

The open face 111 is a congruent end of the prism structure of the protective shell 101. The open face 111 is the open face 111 characteristic of the pan structure that forms the protective shell 101. A personal data device selected from the one or more personal data devices 104 inserts into the protective shell 101 such that the operation of the selected personal data device is operable through the open face 111.

The closed face 112 is the congruent end of the prism structure of the protective shell 101 that is distal from the open face 111. The distribution circuit 102 mounts in the closed face 112. The credit card pocket 115 attaches to the exterior surface of the closed face 112. The plurality of lateral faces 113 are the lateral faces of the pan structure of the protective shell 101.

Each of the plurality of lateral faces 113 is a lateral face of the pan structure of the protective shell 101. Each of the plurality of lateral faces 113 forms a portion of the protective structure formed by the protective shell 101 from the closed face 112 to the open face 111.

The distribution circuit 102 is an electrical circuit. The distribution circuit 102 mounts in the closed face 112 of the protective shell 101. The distribution circuit 102 powers the operation of the distribution cable 103. The distribution circuit 102 is an electrochemical device. The distribution circuit 102 converts chemical potential energy into the electrical energy required to distribute electric power to the one or more personal data devices 104 through the distribution cable 103. The distribution circuit 102 is an independently powered electric circuit. By independently powered is meant that the distribution circuit 102 can operate without an electrical connection to an external power source 144. The distribution circuit 102 comprises an energy indicator 121, a distribution port 122, and a power circuit 123. The energy indicator 121, the distribution port 122, and the power circuit 123 are electrically connected.

The energy indicator 121 is an electric device. The energy indicator 121 is a battery indicator. The battery indicator is defined elsewhere in this disclosure. The energy indicator 121 provides a visual display of the amount of energy remaining in the distribution circuit 102 that is available for distribution to the one or more personal data devices 104. The use of an energy indicator 121 for the purpose described above is well-known and documented in the electrical arts.

The distribution port 122 is an electric port. The distribution port 122 forms an electric connection between the distribution circuit 102 and the distribution cable 103. The distribution port 122 transfers electric energy from the power circuit 123 to the distribution cable 103 for distribution to the one or more personal data devices 104. The power distribution plug 131 of the distribution cable 103 inserts into the distribution port 122 to form the electrical connection between the distribution circuit 102 and the distribution cable 103.

The power circuit 123 comprises a battery 141, a charging diode 142, a charging port 143, and an external power source 144. The external power source 144 further comprises a charging plug 145. The battery 141, the charging diode 142, the charging port 143, and the external power source 144, and the charging plug 145 are electrically connected. The battery 141 further comprises a first positive terminal 181 and a first negative terminal 191. The external power source 144 further comprises a second positive terminal 182 and a second negative terminal 192.

The battery 141 is an electrochemical device. The battery 141 converts chemical potential energy into the electrical energy used to power the distribution circuit 102. The battery 141 is a commercially available rechargeable battery 141. The chemical energy stored within the rechargeable battery 141 is renewed and restored through the use of the charging port 143. The charging port 143 is an electrical circuit that reverses the polarity of the rechargeable battery 141 and provides the energy necessary to reverse the chemical processes that the rechargeable battery 141 initially used to generate the electrical energy. This reversal of the chemical process creates a chemical potential energy that will later be used by the rechargeable battery 141 to generate electricity.

The charging port 143 forms an electrical connection to an external power source 144 using a charging plug 145. The charging plug 145 forms a detachable electrical connection with the charging port 143. The charging port 143 receives electrical energy from the external power source 144 through the charging plug 145. The charging diode 142 is an electrical device that allows current to flow in only one direction. The charging diode 142 installs between the rechargeable battery 141 and the charging port 143 such that electricity will not flow from the first positive terminal 181 of the rechargeable battery 141 into the second positive terminal 182 of the external power source 144. In the first potential embodiment of the disclosure, the external power source 144, the charging plug 145, and the charging port 143 are compatible with USB power requirements.

The distribution cable 103 is an electric cable. The distribution cable 103 distributes electric energy from the distribution circuit 102 to the one or more personal data devices 104. The distribution cable 103 further comprises a power distribution plug 131 and a plurality of distribution sub-circuits 132. The power distribution plug 131 and the plurality of distribution sub-circuits 132 are electrical terminations formed on the distribution cable 103.

The power distribution plug 131 is an electric port. The power distribution plug 131 forms an electric connection between the distribution circuit 102 and the distribution cable 103. The power distribution plug 131 transfers electric energy from the distribution circuit 102 to the plurality of distribution sub-circuits 132 for distribution to the distribution cable 103. The power distribution plug 131 inserts into the distribution port 122 of the distribution circuit 102 to form the electrical connection between the distribution circuit 102 and the plurality of distribution sub-circuits 132 of the distribution cable 103. The power distribution plug 131 is compatible with USB power requirements.

Each of the plurality of distribution sub-circuits 132 is an electric port. Each of the plurality of distribution sub-circuits 132 receives an electric plug associated with a personal data device selected from the one or more personal data devices 104. Each of the plurality of distribution sub-circuits 132 transfers electric energy received from the distribution circuit 102 through the power distribution plug 131 directly to the selected personal data device. In the first potential embodiment of the disclosure, the plurality of distribution sub-circuits 132 comprises a first distribution sub-circuit 151, a second distribution sub-circuit 152, a third distribution sub-circuit 153, and a fourth distribution sub-circuit 154.

The first distribution sub-circuit 151 is an electric plug. The first distribution sub-circuit 151 electrically connects with a personal data device selected from the one or more personal data devices 104 by inserting into the recharging port of a selected personal data device. The first distribution sub-circuit 151 transfers electrical energy from the distribution circuit 102 to the selected personal data device. The first distribution sub-circuit 151 prevents the backflow of electricity from the selected personal data device into the distribution circuit 102. The first distribution sub-circuit 151 further comprises a first distribution plug 161 and a first distribution diode 171.

The first distribution plug 161 is the physical electric plug that inserts into the recharging port of the selected personal data device. In the first potential embodiment of the disclosure, the first distribution plug 161 is compatible with USB power requirements. The first distribution diode 171 is an electrical device that allows current to flow in only one direction. The first distribution diode 171 installs between the power distribution plug 131 and the first distribution plug 161 such that electricity will not flow from the one or more personal data devices 104 through the first distribution plug 161 into the power distribution plug 131.

The second distribution sub-circuit 152 is an electric plug. The second distribution sub-circuit 152 electrically connects with a personal data device selected from the one or more personal data devices 104 by inserting into the recharging port of a selected personal data device. The second distribution sub-circuit 152 transfers electrical energy from the distribution circuit 102 to the selected personal data device. The second distribution sub-circuit 152 prevents the backflow of electricity from the selected personal data device into the distribution circuit 102. The second distribution sub-circuit 152 further comprises a second distribution plug 162 and a second distribution diode 172.

The second distribution plug 162 is the physical electric plug that inserts into the recharging port of the selected personal data device. In the first potential embodiment of the disclosure, the second distribution plug 162 is compatible with USB power requirements. The second distribution diode 172 is an electrical device that allows current to flow in only one direction. The second distribution diode 172 installs between the power distribution plug 131 and the second distribution plug 162 such that electricity will not flow from the one or more personal data devices 104 through the second distribution plug 162 into the power distribution plug 131.

The third distribution sub-circuit 153 is an electric plug. The third distribution sub-circuit 153 electrically connects with a personal data device selected from the one or more personal data devices 104 by inserting into the recharging port of a selected personal data device. The third distribution sub-circuit 153 transfers electrical energy from the distribution circuit 102 to the selected personal data device. The third distribution sub-circuit 153 prevents the backflow of electricity from the selected personal data device into the distribution circuit 102. The third distribution sub-circuit 153 further comprises a third distribution plug 163 and a third distribution diode 173.

The third distribution plug 163 is the physical electric plug that inserts into the recharging port of the selected personal data device. In the first potential embodiment of the disclosure, the third distribution plug 163 is compatible with USB power requirements. The third distribution diode 173 is an electrical device that allows current to flow in only one direction. The third distribution diode 173 installs between the power distribution plug 131 and the third distribution plug 163 such that electricity will not flow from the one or more personal data devices 104 through the third distribution plug 163 into the power distribution plug 131.

The fourth distribution sub-circuit 154 is an electric plug. The fourth distribution sub-circuit 154 electrically connects with a personal data device selected from the one or more personal data devices 104 by inserting into the recharging port of a selected personal data device. The fourth distribution sub-circuit 154 transfers electrical energy from the distribution circuit 102 to the selected personal data device. The fourth distribution sub-circuit 154 prevents the backflow of electricity from the selected personal data device into the distribution circuit 102. The fourth distribution sub-circuit 154 further comprises a fourth distribution plug 164 and a fourth distribution diode 174.

The fourth distribution plug 164 is the physical electric plug that inserts into the recharging port of the selected personal data device. In the first potential embodiment of the disclosure, the fourth distribution plug 164 is compatible with USB power requirements. The fourth distribution diode 174 is an electrical device that allows current to flow in only one direction. The fourth distribution diode 174 installs between the power distribution plug 131 and the fourth distribution plug 164 such that electricity will not flow from the one or more personal data devices 104 through the fourth distribution plug 164 into the power distribution plug 131.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Battery: As used in this disclosure, a battery is a chemical device consisting of one or more cells, in which chemical energy is converted into electricity and used as a source of power. Batteries are commonly defined with a positive terminal and a negative terminal.

Battery Indicator: As used in this disclosure, a battery indicator is an electrical device that measures the chemical potential energy remaining in a battery. A common form of battery indicator is a resistive device coated in a thermal ink that changes color based on the temperature of the resistor. Because the temperature of the resistor will vary as a function of the voltage of the battery and the voltage of many common batteries varies as a function of the available chemical potential energy in the battery, the color of the thermal ink will roughly indicate the chemical potential energy remaining in the battery.

Cable: As used in this disclosure, a cable is a collection of one or more insulated wires covered by a protective casing that is used for transmitting electricity or telecommunication signals.

Credit Card: As used in this disclosure, a credit card is a form of identification that enables a person bearing the card to purchase a good or service from a vendor on the basis of credit provided by either the vendor or a third party. The form factor of a credit card is standardized with dimensions of roughly 3.4 inches by 2.1 inches.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Impact: As used in this disclosure, an impact refers to an exchange of momentum between two objects over a duration. An impact often refers to a collision between two objects.

Interior: As used in this disclosure, the interior is used as a relational term that implies that an object is contained within the boundary of a structure or a space.

Key Ring: As used in this disclosure, a key ring is a metal shaft that forms a helix structure. The key ring is a semi-rigid structure with an elastic nature. The elastic nature of the semi-rigid structure allows the key ring to be threaded through small apertures such as those commonly found on keys.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan. A semi-enclosed pan refers to a pan wherein an end of prism structure of the pan and a portion of the lateral face of the pan is also open.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones. See logical device Plug: As used in this disclosure, a plug is an electrical termination that electrically connects a first electrical circuit to a second electrical circuit or a source of electricity. As used in this disclosure, a plug will have two or three metal pins.

Pocket: As used in this disclosure, a pocket is a storage space that is formed on or into an object.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Ring: As used in this disclosure, a ring is term that is used to describe a disk-like structure through which an aperture is formed. Rings are often considered loops.

Roughly: As used in this disclosure, roughly refers to a comparison between two objects. Roughly means that the difference between one or more parameters of the two compared objects are not significantly different.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Shell: As used in this disclosure, a shell is a structure that forms an outer covering intended to contain an object. Shells are often, but not necessarily, rigid or semi-rigid structures that are intended to protect the object contained within it.

Shell: As used in this disclosure, a shell refers to the exterior surfaces of an object.

Thread: As used in this disclosure, to thread is a verb that refers to inserting a flexible prism structure through an aperture.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A mobile device case comprising
a protective shell, a distribution circuit, and a distribution cable;
wherein the distribution cable electrically connects to the distribution circuit;
wherein the distribution circuit mounts in the protective shell;
wherein the mobile device case is configured for use with one or more personal data devices;
wherein a personal data device selected from one or more personal data devices installs in the protective shell;
wherein the remaining one or more personal data devices electrically connect to the distribution cable such that each of the remaining one or more personal data devices draws electrical energy from the distribution circuit.

2. The mobile device case according to claim 1 wherein the distribution circuit is an electrochemical structure that: a) stores chemical potential energy; b) converts the chemical potential energy into electrical energy; and, c) distributes the converted electrical energy to the remaining one or more personal data devices.

3. The mobile device case according to claim 2
wherein the protective shell is a protective structure;
wherein the protective shell is a rigid structure;
wherein the protective shell has a roughly prism shape;
wherein the protective shell has a roughly pan shape.

4. The mobile device case according to claim 3 wherein the protective shell contains a personal data device selected from the one or more personal data devices such that the selected personal data device is useable while in the protective shell.

5. The mobile device case according to claim 4
wherein the distribution circuit is an electrical circuit;
wherein the distribution circuit powers the operation of the distribution cable;
wherein the distribution circuit is an electrochemical device;
wherein the distribution circuit converts chemical potential energy into the electrical energy required to distribute electric power to the one or more personal data devices through the distribution cable.

6. The mobile device case according to claim 5
wherein the distribution circuit is an independently powered electric circuit;
wherein by independently powered is meant that the distribution circuit can operate without an electrical connection to an external power source.

7. The mobile device case according to claim 6
wherein the distribution cable is an electric cable;
wherein the distribution cable distributes electric energy from the distribution circuit to the one or more personal data devices.

8. The mobile device case according to claim 7
wherein the protective shell comprises an open face, a closed face, and a plurality of lateral faces;
wherein the protective shell further comprises a ring and a credit card pocket;
wherein the credit card pocket is a storage space that mounts on the exterior surface of the closed face of the protective shell;
wherein the ring attaches to the exterior surface of the credit card pocket;
wherein the open face is a congruent end of the prism structure of the protective shell;
wherein the closed face is the congruent end of the prism structure of the protective shell that is distal from the open face;
wherein the plurality of lateral faces are the lateral faces of the pan structure of the protective shell.

9. The mobile device case according to claim 8 wherein the distribution circuit mounts in the closed face of the protective shell.

10. The mobile device case according to claim 9
wherein the distribution circuit comprises an energy indicator, a distribution port, and a power circuit;
wherein the energy indicator, the distribution port, and the power circuit are electrically connected.

11. The mobile device case according to claim 10
wherein the distribution cable further comprises a power distribution plug and a plurality of distribution sub-circuits;
wherein the power distribution plug and the plurality of distribution sub-circuits are electrical terminations formed on the distribution cable.

12. The mobile device case according to claim 11
wherein the energy indicator is an electric device;
wherein the energy indicator is a battery indicator;
wherein the energy indicator provides a visual display of the amount of energy remaining in the distribution circuit that is available for distribution to the one or more personal data devices.

13. The mobile device case according to claim 12
wherein the distribution port is an electric port;
wherein the distribution port forms an electric connection between the distribution circuit and the distribution cable;
wherein the distribution port transfers electric energy from the power circuit to the distribution cable for distribution to the one or more personal data devices;
wherein the power distribution plug of the distribution cable inserts into the distribution port to form the electrical connection between the distribution circuit and the distribution cable.

14. The mobile device case according to claim 13
wherein the power distribution plug is an electric port;
wherein the power distribution plug forms an electric connection between the distribution circuit and the distribution cable;
wherein the power distribution plug transfers electric energy from the distribution circuit to the plurality of distribution sub-circuits for distribution to the distribution cable;
wherein the power distribution plug inserts into the distribution port of the distribution circuit to form the electrical connection between the distribution circuit and the plurality of distribution sub-circuits of the distribution cable.

15. The mobile device case according to claim 14
wherein each of the plurality of distribution sub-circuits is an electric port;
wherein each of the plurality of distribution sub-circuits receives an electric plug associated with a personal data device selected from the one or more personal data devices;
wherein each of the plurality of distribution sub-circuits transfers electric energy received from the distribution circuit through the power distribution plug directly to the selected personal data device.

16. The mobile device case according to claim 15
wherein the plurality of distribution sub-circuits comprises a first distribution sub-circuit, a second distribution sub-circuit, a third distribution sub-circuit, and a fourth distribution sub-circuit;
wherein the first distribution sub-circuit is an electric plug;
wherein the first distribution sub-circuit electrically connects with a personal data device selected from the one or more personal data devices by inserting into the recharging port of a selected personal data device;
wherein the first distribution sub-circuit transfers electrical energy from the distribution circuit to the selected personal data device;
wherein the first distribution sub-circuit prevents the backflow of electricity from the selected personal data device into the distribution circuit;
wherein the second distribution sub-circuit is an electric plug;
wherein the second distribution sub-circuit electrically connects with a personal data device selected from the one or more personal data devices by inserting into the recharging port of a selected personal data device;
wherein the second distribution sub-circuit transfers electrical energy from the distribution circuit to the selected personal data device;
wherein the second distribution sub-circuit prevents the backflow of electricity from the selected personal data device into the distribution circuit;
wherein the third distribution sub-circuit is an electric plug;
wherein the third distribution sub-circuit electrically connects with a personal data device selected from the one or more personal data devices by inserting into the recharging port of a selected personal data device;
wherein the third distribution sub-circuit transfers electrical energy from the distribution circuit to the selected personal data device;
wherein the third distribution sub-circuit prevents the backflow of electricity from the selected personal data device into the distribution circuit;
wherein the fourth distribution sub-circuit is an electric plug;
wherein the fourth distribution sub-circuit electrically connects with a personal data device selected from the one or more personal data devices by inserting into the recharging port of a selected personal data device;
wherein the fourth distribution sub-circuit transfers electrical energy from the distribution circuit to the selected personal data device;
wherein the fourth distribution sub-circuit prevents the backflow of electricity from the selected personal data device into the distribution circuit.

17. The mobile device case according to claim 16
wherein the first distribution sub-circuit further comprises a first distribution plug and a first distribution diode;
wherein the first distribution plug is the physical electric plug that inserts into the recharging port of the selected personal data device;
wherein the first distribution diode is an electrical device that allows current to flow in only one direction;
wherein the first distribution diode installs between the power distribution plug and the first distribution plug such that electricity will not flow from the one or more personal data devices through the first distribution plug into the power distribution plug;
wherein the second distribution sub-circuit further comprises a second distribution plug and a second distribution diode;
wherein the second distribution plug is the physical electric plug that inserts into the recharging port of the selected personal data device;
wherein the second distribution diode is an electrical device that allows current to flow in only one direction;
wherein the second distribution diode installs between the power distribution plug and the second distribution plug such that electricity will not flow from the one or more personal data devices through the second distribution plug into the power distribution plug;

wherein the third distribution sub-circuit further comprises a third distribution plug and a third distribution diode;

wherein the third distribution plug is the physical electric plug that inserts into the recharging port of the selected personal data device;

wherein the third distribution diode is an electrical device that allows current to flow in only one direction;

wherein the third distribution diode installs between the power distribution plug and the third distribution plug such that electricity will not flow from the one or more personal data devices through the third distribution plug into the power distribution plug;

wherein the fourth distribution sub-circuit further comprises a fourth distribution plug and a fourth distribution diode;

wherein the fourth distribution plug is the physical electric plug that inserts into the recharging port of the selected personal data device;

wherein the fourth distribution diode is an electrical device that allows current to flow in only one direction;

wherein the fourth distribution diode installs between the power distribution plug and the fourth distribution plug such that electricity will not flow from the one or more personal data devices through the fourth distribution plug into the power distribution plug.

18. The mobile device case according to claim 17 wherein the power circuit comprises a battery, a charging diode, a charging port, and the external power source;

wherein the external power source further comprises a charging plug;

wherein the battery, the charging diode, the charging port, and the external power source, and the charging plug are electrically connected;

wherein the battery further comprises a first positive terminal and a first negative terminal;

wherein the external power source further comprises a second positive terminal and a second negative terminal.

19. The mobile device case according to claim 18 wherein the battery is an electrochemical device;

wherein the battery converts chemical potential energy into the electrical energy used to power the distribution circuit;

wherein the battery is a rechargeable battery;

wherein the charging port is an electrical circuit that reverses the polarity of the rechargeable battery and provides the energy necessary to reverse the chemical processes that the rechargeable battery initially used to generate the electrical energy;

wherein the charging port forms an electrical connection to an external power source using a charging plug;

wherein the charging plug forms a detachable electrical connection with the charging port;

wherein the charging port receives electrical energy from the external power source through the charging plug.

20. The mobile device case according to claim 19 wherein the charging diode is an electrical device that allows current to flow in only one direction;

wherein the charging diode installs between the rechargeable battery and the charging port such that electricity will not flow from the first positive terminal of the rechargeable battery into the second positive terminal of the external power source.

* * * * *